April 17, 1934.     H. H. WATERS     1,954,968
AUTOMATIC FUEL PROPORTIONING DEVICE FOR GAS ENGINES
Original Filed Oct. 5, 1925
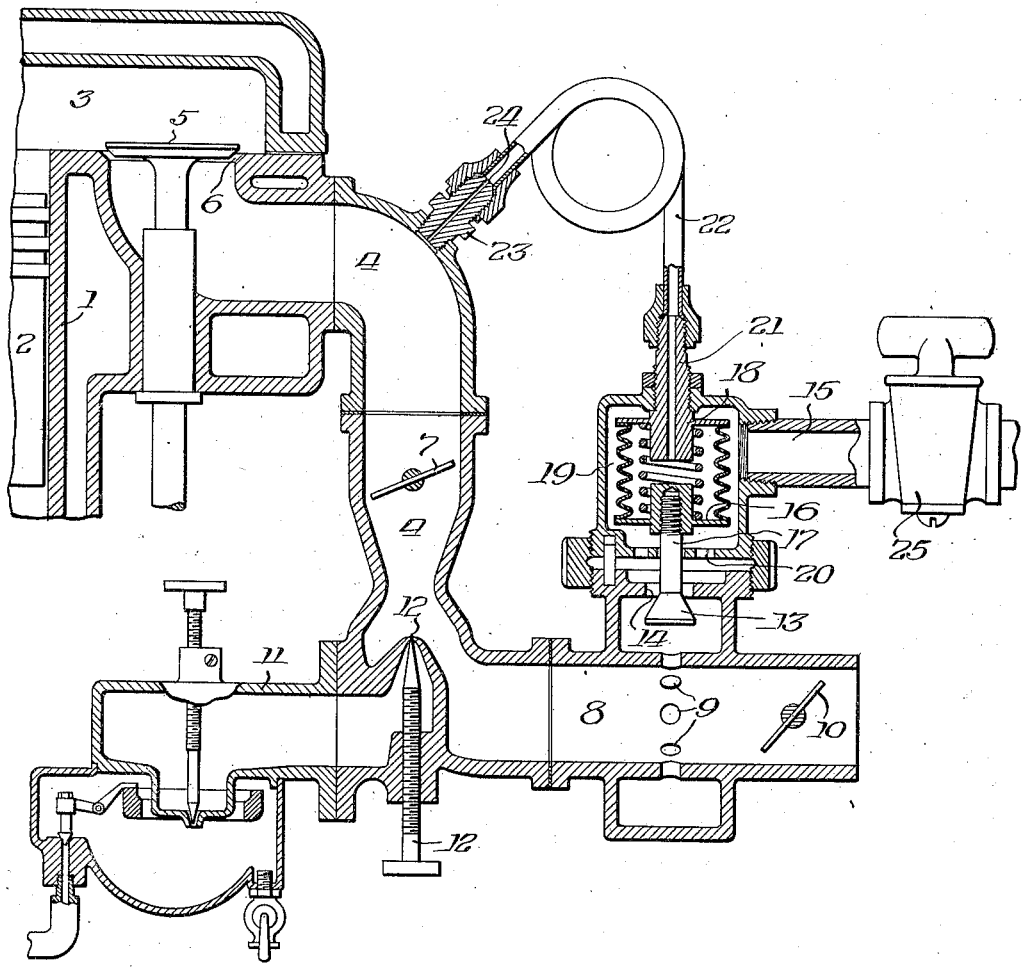
Witness:
Inventor:
Harry H. Waters,
Wilkinson, Huxley, Byron & Knight,
By
Attys.

Patented Apr. 17, 1934

1,954,968

UNITED STATES PATENT OFFICE 1,954,968

AUTOMATIC FUEL PROPORTIONING DEVICE FOR GAS ENGINES

Harry H. Waters, Clinton, Iowa, assignor to Climax Engineering Company, Clinton, Iowa, a corporation of Delaware Application October 5, 1925, Serial No. 60,652
Renewed December 4, 1930

5 Claims. (Cl. 123—121)

This invention relates to means for automatically proportioning the quantities of air and gas that enter into the combustible mixture supplied to an internal combustion engine. Devices heretofore employed for proportioning gaseous fuel and its combustion supporting medium, such as air, while using various forms of valves automatically actuated by engine suction, have not, in their operative principles, provided for constancy of the mixture for all speeds and loads of the engine, and, as a consequence, a mixture which approaches theoretically correct proportions at a low speed and load will, owing to the greater pressure under which the gaseous element of the fuel is delivered as compared with atmospheric pressure under which the air enters, result in an unduly lean mixture when the engine speed and load are high.

The present invention regulates the fuel constituent of the mixture by providing an adjustable valve in controlling relation to the fuel element alone, and bringing this valve under control of a diaphragm or other actuating element which responds to changes in pressure at the intake port of the engine, that is to say, the pressure existing in the induction passage above the throttle valve as distinguished from being responsive to velocity of flow of fuel mixture through a venturi and past a suction port. In other words, in the operation of the present invention, reducing the throttle opening to slow down the engine increases suction in the manifold pipe above the throttle valve, and draws the fuel valve toward its seat, as distinguished from reducing the suction on a pipe leading from the fuel valve or reducing the flow of fuel mixture through the venturi by reducing the throttle valve opening. The invention is applicable not only to engines which utilize fixed gas alone as the fuel element, but also to arrangements whereby a fixed gas supply is used in conjunction or alternately with liquid fuel.

In carrying out the invention, the suction actuated device is in the form of a diaphragm, bellows, a piston, or other known element, which is acted upon in the direction to close the fuel valve by the pressure under which the fuel element is supplied while the other side is in communication, through a tube or conduit, with that portion of the induction passage of the engine which lies between the throttle valve and the intake port and acts upon the pressure controlled element also in the direction to close the valve when the pressure drops or vacuum builds up in the manifold, but leaves the suction actuated device free to move in the direction to open the valve, as chokage in the manifold is reduced by opening the throttle valve, the proportion of fuel supplied to the carbureter being thus regulated by two influences, one of which renders the readiness of the fuel element to respond substantially constant notwithstanding variation of pressure under which it is supplied, while the other regulates the possibility of response according to the full demand of the engine; and does so by relative vacuum between the throttle valve and the intake port of the engine; a portion of the tube or conduit consisting of a choke or stricture which dampens out fluctuations resulting from engine pulsations; and means being provided for initially adjusting the fuel valve relatively to its seat, consisting preferably of a nut which adjustably unites the portion of the shell which carries the valve seat with a separately formed portion thereof in which the suction device is located; and the conduit being coiled or otherwise developed in a form which is sufficiently indirect to afford necessary flexibility to allow for the said initial valve adjustment.

In order that the invention may be fully understood, the preferred embodiment thereof will be described in connection with the accompanying drawing, which represents, in section, a portion of an internal combustion engine with its fuel feeding and mixing elements.

1 represents a cylinder, 2 a piston, and 3 a combustion chamber of an internal combustion engine, while 4 represents the induction passage, and 5 represents the valve which alternately opens under the suction of the piston and closes against the valve seat 6 under compression within the engine. 7 represents a throttle valve for regulating the volume of fuel mixture entering the passage 4 under the suction of the engine; 8 represents a mixing chamber constructed with an annular series of ports 9 for admission thereto of a gaseous fuel element; and 10 represents a valve that may be set at a fixed position to determine the proportion of combustion supporting medium, for instance, atmospheric air, which enters the mixing chamber. The parts thus far described may be of any approved standard construction, and there may also be employed in connection therewith any suitable form of carbureter or liquid fuel feeding device, such as suggested at 11, but which, for the purposes of the present invention will have its communication with the passage 4 through a needle valve or other form of control 12, in order that liquid fuel may be admitted only when or in such proportions as may be desired.

According to the present invention, a valve 13, movably sustained in relation to a seat or port 14, is interposed in controlling relation to fuel entering under pressure from a pipe 15; said valve 13 is brought under control of a suction actuated element 16, for instance, the bellows diaphragm or bellows, into the base or movable head of which the valve stem 17 is screwed, while its head 18 is held stationary. The element 16 is enclosed in a pressure chamber 19 through which gas enters from the pipe 15 and from which gas escapes through ports 20, sufficiently restricted to cause the gas pressure to exert its influence on the exterior of the suction device before passing the valve 13. The interior of element 16 stands in communication, through the shank 21 of the fixed head 18 and through the coiled tube 22, with the induction passage 4 of the engine, said tube being conveniently connected with the said passage through means of the nipple 23 having a restricted bore 24. Thus, the interior of the suction actuated element, or that surface thereof which is opposite to the surface subjected to pressure in the chamber 19, will always reflect pressure conditions in intake passage 4, usually materially below atmospheric, but such pressure will not reflect the pulsations of the pressure in the passage 4 because of the restricted passage 24, which is very small in comparison with the capacity of the suction side of the element 16.

By the provision of a cut off 25 in the gas pipe 15 and the valve 12 in the carbureter 11, an engine equipped as above described may be operated with either form of fuel at will, or by a fuel mixture produced partly from liquid and partly from gaseous fuel.

I claim:

1. In a combustion engine, an intake passage for fuel mixture, means supplying fuel and combustion supporting elements to said passage, a valve controlling the admission of fuel element to said passage, a suction actuated element controlling said valve, subjected on one side to the pressure of fuel element and on the other side to suction of the intake passage, a shell formed in two parts, one of which carries the suction element and the other of which provides a port with which the valve coacts, and means for adjustably uniting the two portions of said shell to change the initial relation of the valve to its seat.

2. In a combustion engine, an intake passage subject to suction of the engine, a fuel supply, a valve for controlling said fuel supply, a suction actuated element controlling said valve, a shell formed in two parts, one of which encloses the suction actuated element and the other of which provides a port with which the valve coacts, a nut adjustably connecting the two portions of said shell, and a flexible conduit establishing communication between the suction actuated element and the intake passage.

3. A combustion engine having, in combination, an intake manifold, a passageway for supplying fuel to the intake manifold, a throttle valve interposed between the fuel conducting passageway and the manifold for controlling the admission of fuel from the former to the latter, and means for controlling the amount of fuel admitted to the conducting passageway, said means comprising a valve, a member for actuating the valve, and a conduit connecting the actuating member with the interior of the intake manifold, the conduit being provided with an opening restricted relatively to the conduit, said opening leading into the intake manifold whereby the actuating member and the valve are unresponsive to sudden fluctuations in pressure occurring in the intake manifold.

4. An internal combustion engine having, in combination, an intake manifold, a plurality of fuel conducting passageways connecting with one another and with the intake manifold, a throttle valve interposed between the fuel conducting passageways and the intake manifold, and means for controlling the admission of fuel to one of the fuel conducting passageways, said means comprising a valve and a movable member responsive to substantial variations in the pressure of the fuel flowing through the valve and the pressure of the fuel flowing through the intake manifold for actuating the valve.

5. An internal combustion engine having, in combination, an intake manifold, a plurality of fuel conducting passageways connected with the intake manifold, a valve interposed between the fuel conducting passageways and the manifold for governing the passage of fuel therebetween, and means for controlling the admission of fuel from a main source of supply to one of the fuel conducting passageways, said means comprising a valve, a movable member for actuating the valve, a passageway having a restricted opening communicating with the intake manifold for transmitting substantial variations in pressure occurring in the intake manifold to the movable member whereby the valve opening is accordingly varied, said movable member being also responsive to variations in the pressure of the fuel leading from the main source of supply whereby the valve opening varies also in proportion to the pressure of fuel being supplied.

HARRY H. WATERS.